(12) United States Patent
Dudar

(10) Patent No.: US 11,560,132 B2
(45) Date of Patent: Jan. 24, 2023

(54) ADAPTIVE REFUELING FOR EVAPORATIVE EMISSION CONTROL

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 17/149,579

(22) Filed: Jan. 14, 2021

(65) Prior Publication Data
US 2022/0219667 A1 Jul. 14, 2022

(51) Int. Cl.
*B60T 7/12* (2006.01)
*B60W 20/00* (2016.01)
*B60K 15/035* (2006.01)
*B60W 40/12* (2012.01)
*B01D 53/04* (2006.01)

(52) U.S. Cl.
CPC ......... *B60W 20/00* (2013.01); *B01D 53/0415* (2013.01); *B01D 53/0446* (2013.01); *B01D 53/0454* (2013.01); *B60K 15/03504* (2013.01); *B60K 15/03519* (2013.01); *B60W 40/12* (2013.01); *B01D 2253/102* (2013.01); *B01D 2257/702* (2013.01); *B01D 2259/40086* (2013.01); *B01D 2259/4516* (2013.01); *B60K 2015/03561* (2013.01); *B60W 2556/50* (2020.02)

(58) Field of Classification Search
CPC ....... A61Q 19/007; A61K 35/00; A61K 35/74
See application file for complete search history.

(56) References Cited

U.S. PATENT DOCUMENTS

| 6,085,731 A | 7/2000 | Duty |
| 9,371,793 B2 | 6/2016 | Blumenstock et al. |
| 2013/0032127 A1* | 2/2013 | Jentz ................. F02M 25/0809 123/520 |
| 2017/0292476 A1* | 10/2017 | Dudar .............. B60K 15/03504 |
| 2020/0182174 A1* | 6/2020 | Dudar .................. F02M 25/089 |

* cited by examiner

*Primary Examiner* — John Kwon
(74) *Attorney, Agent, or Firm* — Vincent Mastrogiacomo; McCoy Russell LLP

(57) ABSTRACT

Methods and systems are provided for an evaporative emission control system. In one example, a method may include halting a dispensing of fuel to a fuel tank during a refueling event by increasing a backpressure in the fuel tank. The halt to fuel dispensing may be executed based on one or more of an upcoming fuel vapor canister purge event and an estimated fuel vapor canister loading capacity to determine a predicted canister breakthrough. The predicted canister breakthrough may be compared to a threshold to regulate a refueling volume.

13 Claims, 6 Drawing Sheets

ADAPTIVE REFUELING FOR EVAPORATIVE EMISSION CONTROL

FIELD

The present description relates generally to methods and systems for controlling fuel vapor canister loading to reduce evaporative emissions.

BACKGROUND/SUMMARY

Vehicle fuel systems may include evaporative emission control (EVAP) systems designed to reduce the release of fuel vapors to the atmosphere. For example, vaporized hydrocarbons (HCs) from a fuel tank may be stored in a fuel vapor canister packed with an adsorbent which adsorbs and stores the vapors. In particular, the fuel vapor canister may adsorb HCs from the fuel tank during refueling events where a partial pressure of fuel vapors may increase as a head volume in the fuel tank decreases. At a later time, when the vehicle engine is in operation, the EVAP system allows the vapors to be purged into the engine intake manifold for use as fuel.

A capacity of the fuel vapor canister to store HCs may be affected by variations in ambient conditions. For example, the fuel vapor canister capacity may decrease under hot ambient temperatures and increase under cold ambient temperatures, leading to diurnal and climate-induced variations in HC loading. In particular, in hot climates and after a vehicle drive cycle, the fuel vapor canister may be subjected to high temperatures due to heat rejection from exhaust gases, thermal radiation from road surfaces, etc., which may reduce the adsorption capacity of the fuel vapor canister by up to 67%. If parked in a hot environment after vehicle-off, breakthrough emissions may escape from the EVAP system of the vehicle.

Attempts to address breakthrough emissions from a fuel vapor canister includes operating the EVAP system based on predictive route data. One example approach is shown by Blumenstock et al. in U.S. Pat. No. 9,371,793. Therein, data obtained from, for example, a vehicle navigation unit and data reflecting a driving style of a driver (e.g., based on accelerator dynamics) may be used to determine when the fuel vapor canister is to be purged. Predictive route data provided by the navigation unit allows a controller to recognize when the vehicle is approaching an end of a drive cycle, during which regeneration of the fuel vapor canister is executed. A timing of the regeneration corresponds to a value estimated based on a loading factor of the fuel vapor canister. As a result, when the vehicle is keyed off, the fuel vapor canister is at a maximum loading capacity, enabling adsorption of fuel vapors from a fuel tank while the vehicle is parked.

However, the inventors herein have recognized potential issues with such a system. As one example, regeneration of the fuel vapor canister requires engine operation for a minimum duration of time immediately after the vehicle is refueled. The minimum duration of time, such as 20 minutes, allows complete purging of HCs (e.g., at least 90% removal) from the fuel vapor canister to the engine intake where the HCs are re-combusted. In a vehicle with an alternate engine technology, however, such as start/stop, a mild hybrid-electric vehicle (HEV), a variable displacement engine (VDE), etc., the engine may be operated for less than the minimum duration of time. As such, parking the vehicle in hot conditions with a fully refueled tank after brief engine operation may lead to breakthrough emissions due to a combination of reduced adsorption capacity of the fuel vapor canister and high fuel tank vapor pressure (e.g., diurnal vapors).

In one example, the issues described above may be addressed by a method for halting a dispensing of fuel to a fuel tank during a refueling event by increasing a backpressure in the fuel tank, the halting of the dispensing of fuel based on one or more of an upcoming fuel vapor canister purge event and an estimated fuel vapor canister loading capacity. In this way, a likelihood of breakthrough emissions during vehicle-off period subsequent to the refueling event may be reduced.

As one example, the method may include an adaptive refueling adjustment where the upcoming fuel vapor canister purge and the estimated fuel vapor canister loading capacity may be used to determine a predicted canister breakthrough value. The value may be compared to a threshold value and, if confirmed to be above the threshold value, may cause the amount of fuel dispensed to the fuel tank to be reduced. By reducing the amount of dispensed fuel, loading at the fuel vapor canister is decreased during the refueling event. Breakthrough emissions during the vehicle vehicle-off period is thereby circumvented.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
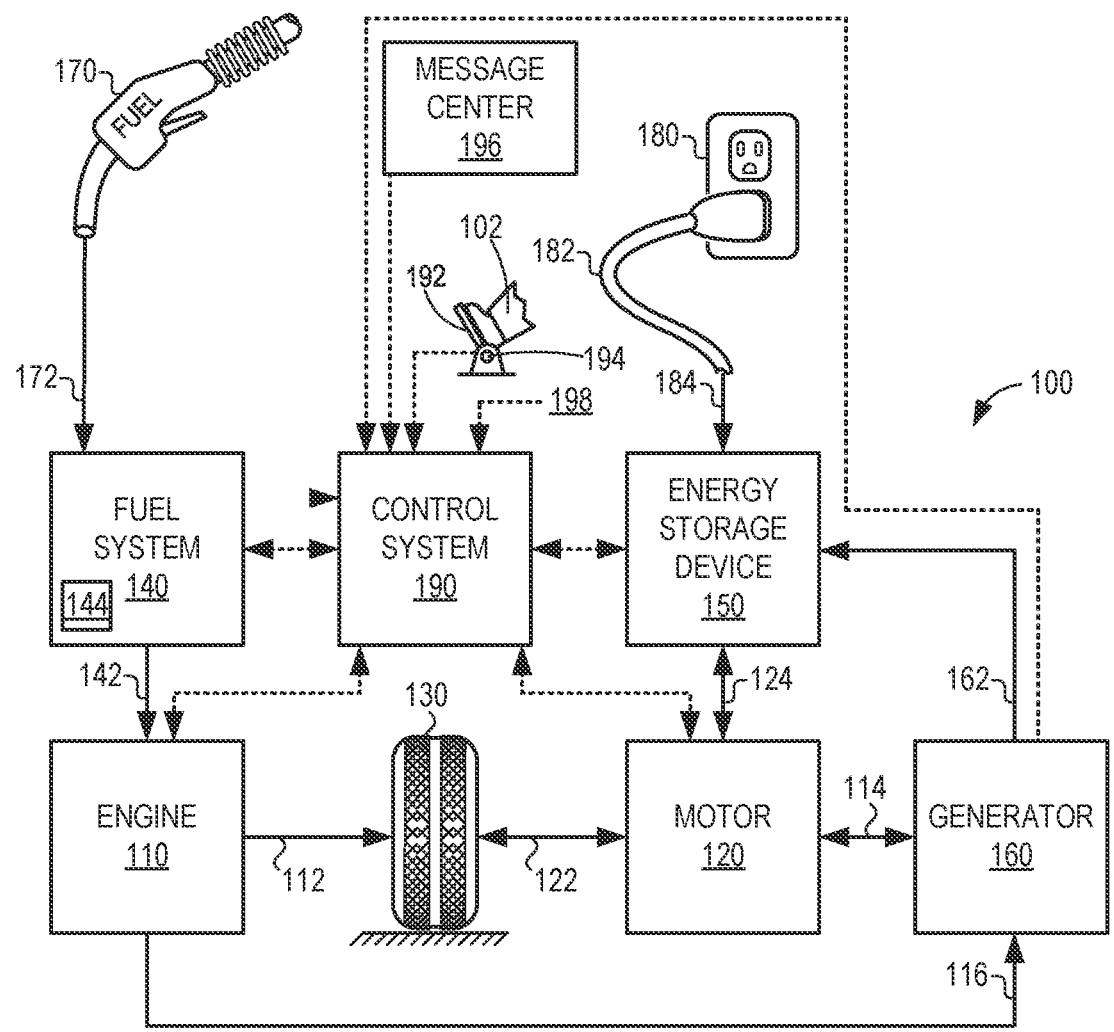
FIG. 1 shows an example vehicle propulsion system.
Figure 2:
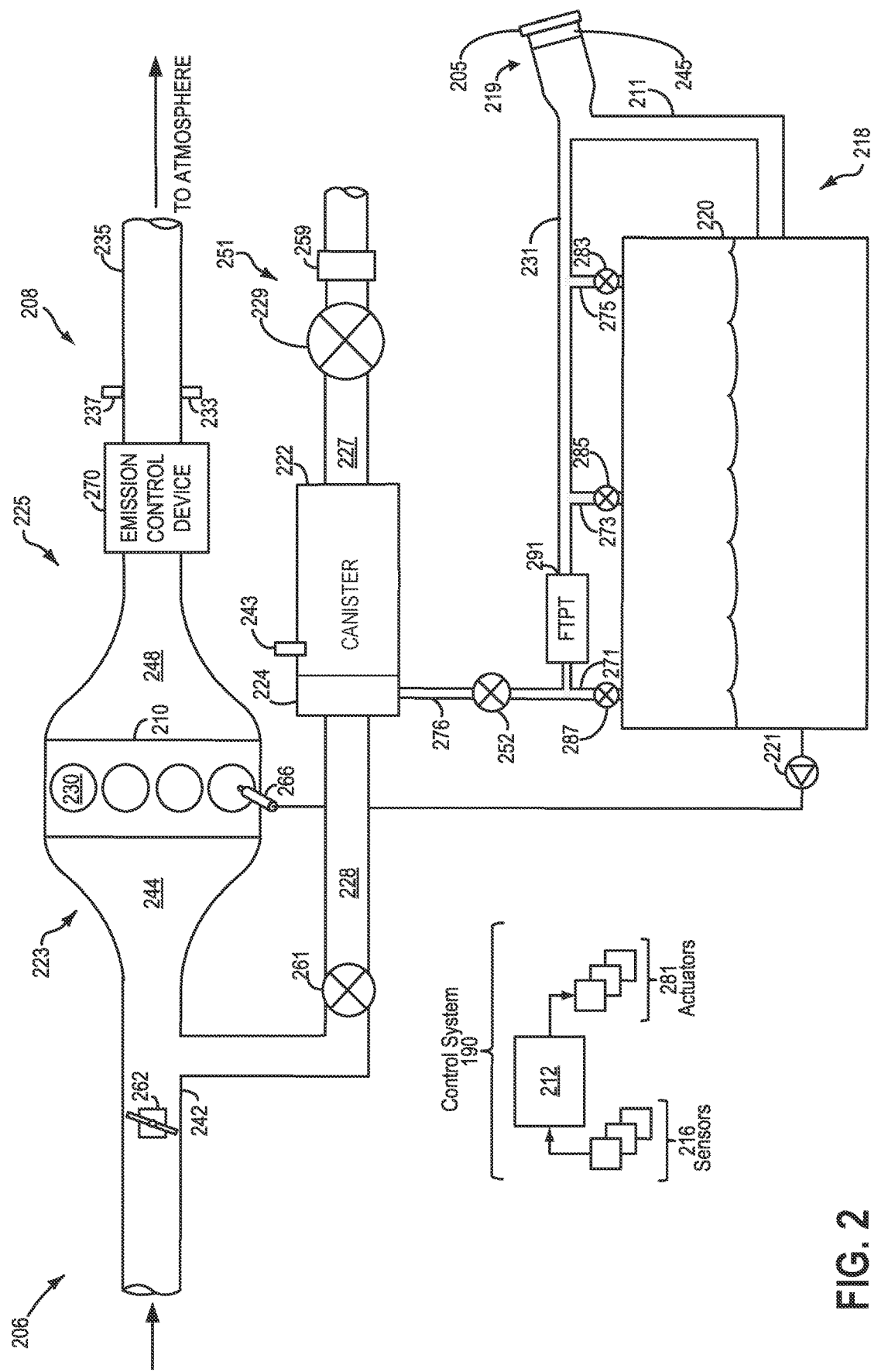
FIG. 2 shows an example fuel system and evaporative emission (EVAP) control system that may be coupled to the vehicle propulsion system of FIG. 1.
Figure 4:
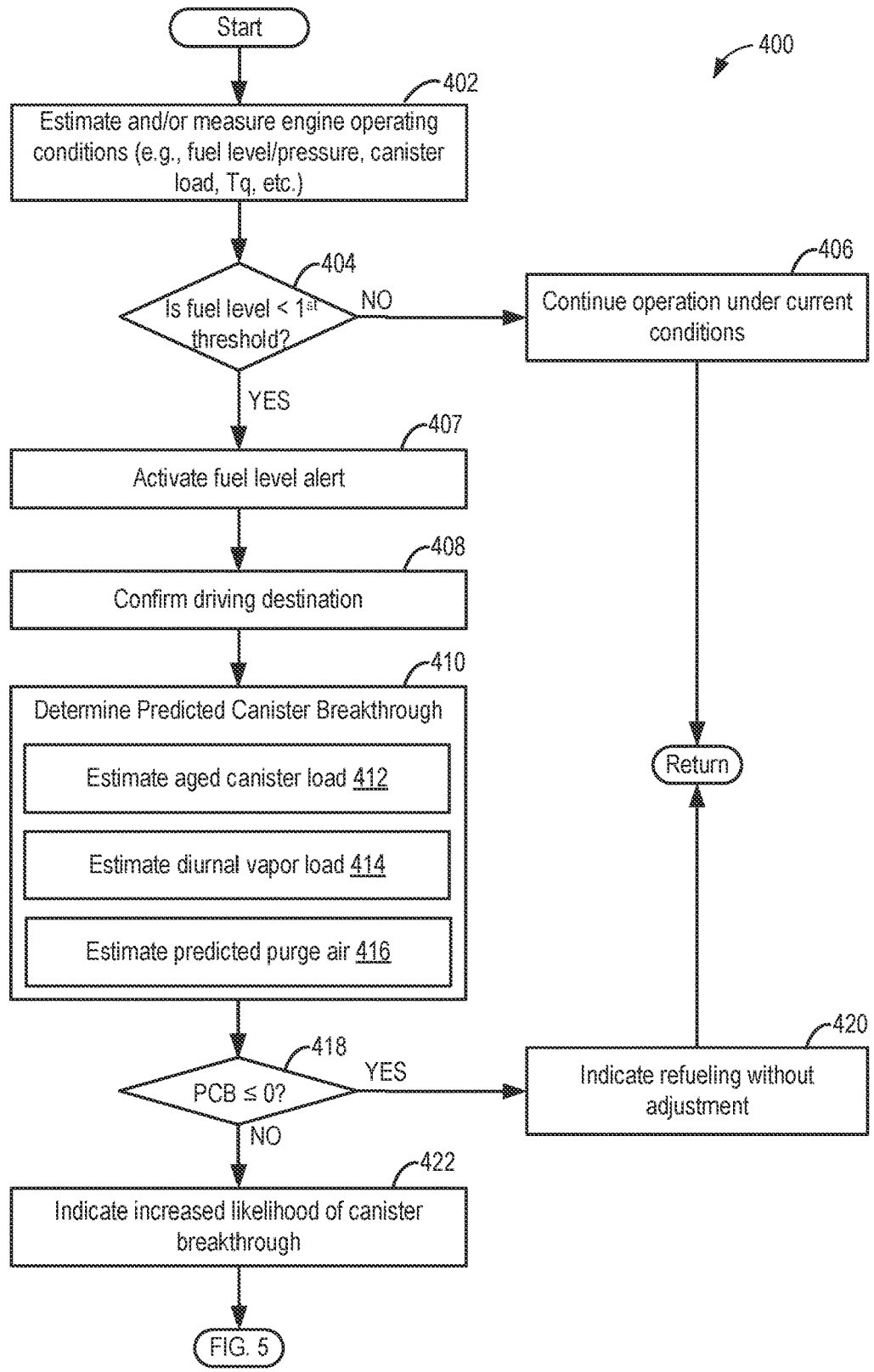
FIG. 4 shows an example of a method for reducing breakthrough emissions via adaptive refueling adjustment at a fuel vapor canister.
Figure 5:
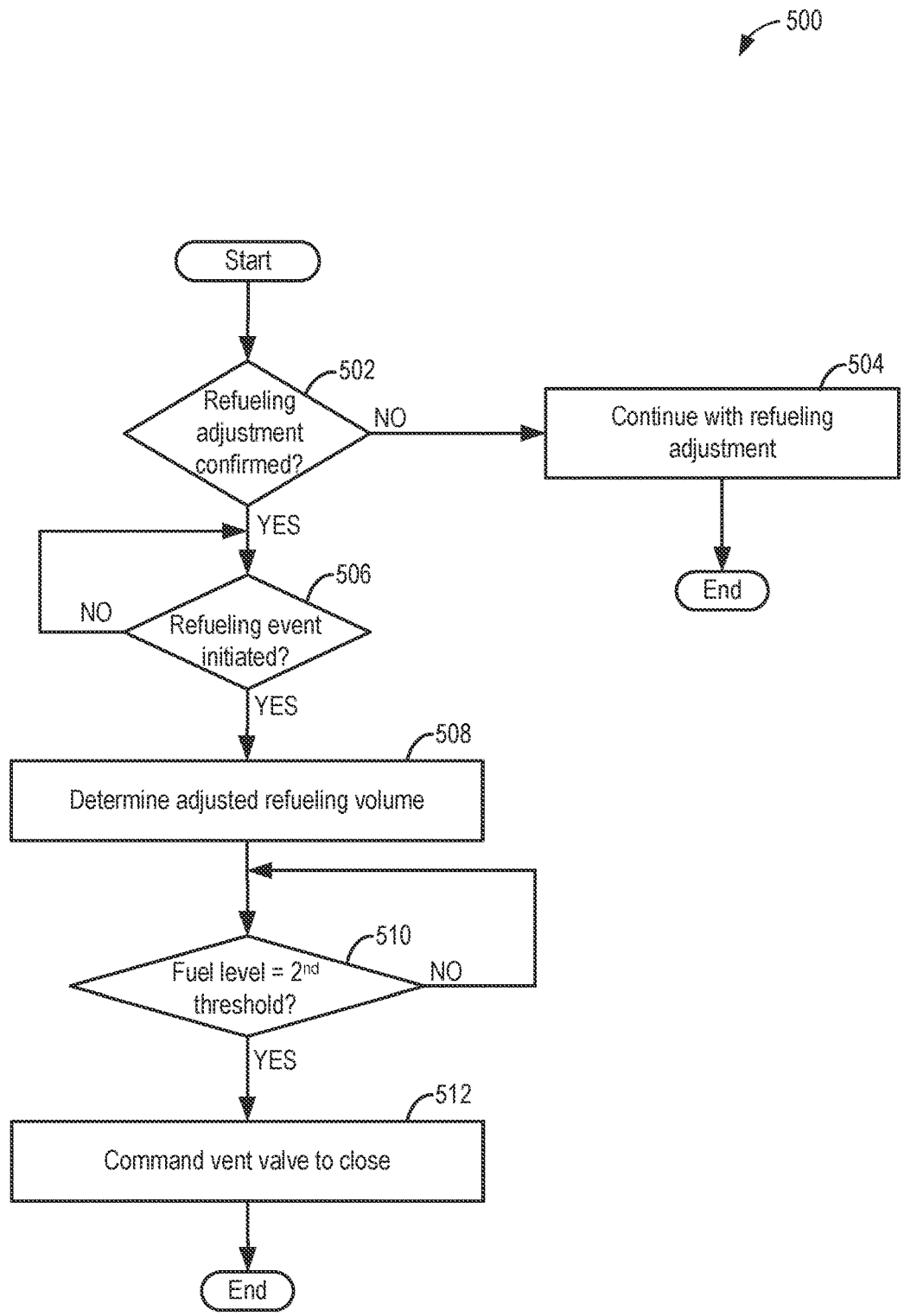
FIG. 5 shows an example of a method for reducing a volume of fuel dispensed to a fuel tank during a refueling event.
Figure 6:
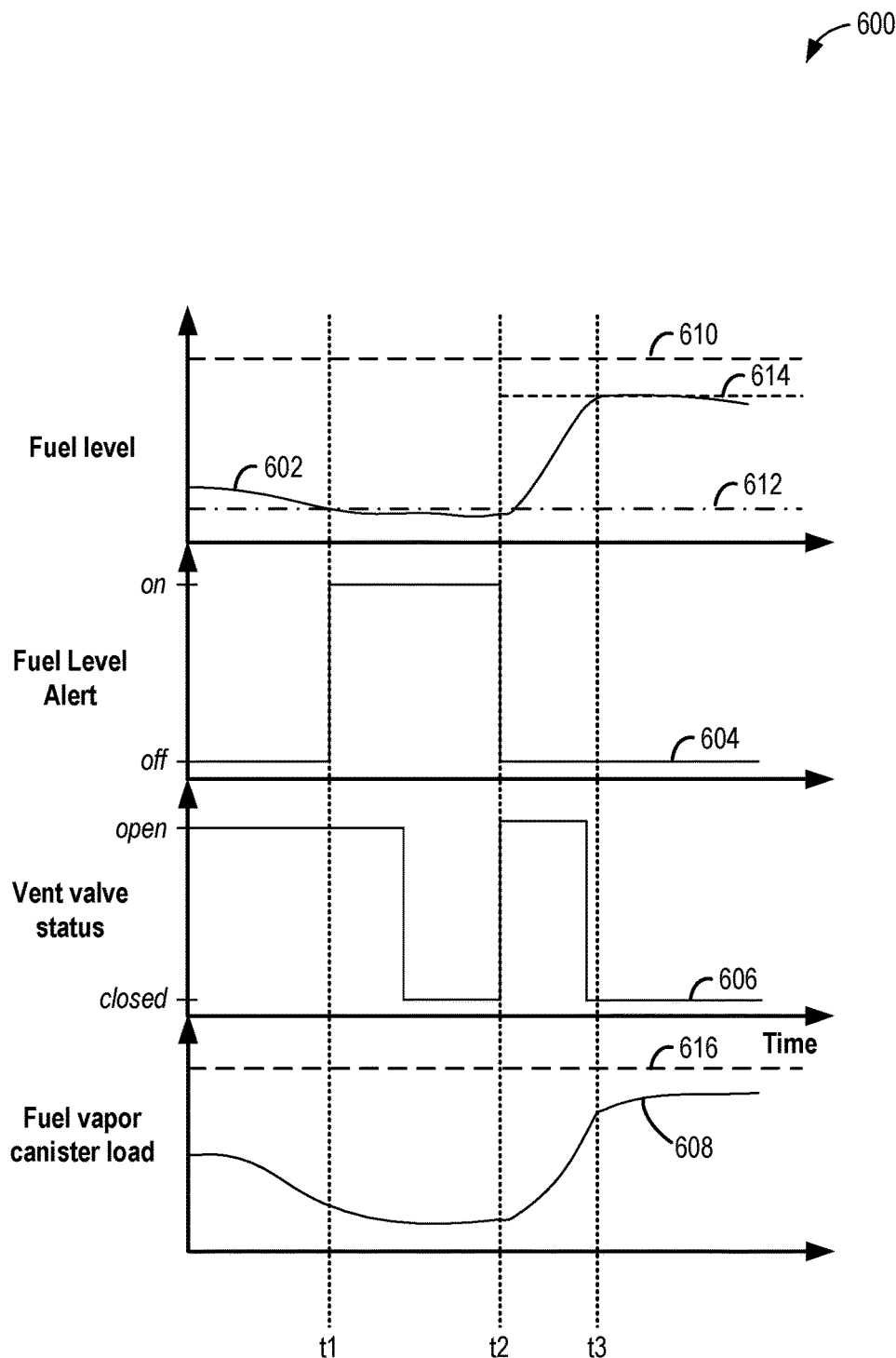
FIG. 6 shows example operations and parameters in an EVAP system during adaptive refueling adjustment in a vehicle.

The following description relates to systems and methods for reducing evaporation emissions from a vehicle. The vehicle may be propelled, at least in part, by an engine which may generate undesirable emissions during fuel combustion. An example of a propulsion system for a vehicle utilizing both the engine and electrical energy to power vehicle travel is shown in FIG. 1. A fuel system of the engine may include an EVAP system, as shown in FIG. 2, to reduce emissions during engine operation. However, subsequent to a refueling event during which fuel vapors are absorbed by a fuel vapor canister of the EVAP system, canister breakthrough may occur (e.g., escape of fuel vapors from the EVAP system due to saturation of the fuel vapor canister) when the vehicle is parked after a short drive cycle and exposed to increases in ambient temperature. To reduce a likelihood of canister breakthrough, an adaptive refueling adjustment may be implemented to regulate an amount of fuel dispensed to a fuel tank of the vehicle based on an expected, e.g., predicted, canister purge event and an expected canister loading after the refueling event. A vehicle user may be notified of the adjustment to refueling at a user interface of the vehicle, as illustrated in FIG. 4. Examples of methods for mitigating canister breakthrough via adaptive refueling adjustment and for adjusting the amount of dispensed fuel during refueling are shown in FIGS. 4 and 5, respectively. Variations in operations of the EVAP system during execution of the adaptive refueling adjustment are depicted in FIG. 6.

FIG. 1 illustrates an example vehicle propulsion system 100. Vehicle propulsion system 100 includes a fuel burning engine 110 and a motor 120. As a non-limiting example, engine 110 may be an internal combustion engine and motor 120 may be an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle, such as from solar or wind energy. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a display at a vehicle dashboard 196.

FIG. 2 shows a schematic depiction of a vehicle system 206. The vehicle system 206 includes an engine system 208 coupled to an emissions control system 251 and a fuel system 218. Emission control system 251 includes a fuel vapor container such as fuel vapor canister 222 which may be used to capture and store fuel vapors. In some examples, vehicle system 206 may be an HEV system, such as vehicle propulsion system 100 of FIG. 1. Control system 190 of FIG. 1 is also included in the vehicle system 206.

The engine system 208 may include engine 110 of FIG. 1, where engine 110 is shown having a plurality of cylinders 230. The engine 110 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. The one or more emission control devices 270 may include a three-way catalyst, lean NOx trap, diesel particulate filter, oxidation catalyst, etc. It will be appreciated that other components may be included in the engine system 208 such as a variety of valves and sensors.

Fuel system 218 may include a fuel tank 220 coupled to a fuel pump system 221. In one example, fuel tank 220 may be an embodiment of the fuel tank 144 of FIG. 1. The fuel pump system 221 may include one or more pumps for pressurizing fuel delivered to the injectors of engine 210 (which may be an embodiment of the engine 110 of FIG. 1), such as the example injector 266 shown. While only a single injector 266 is shown, additional injectors are provided for each cylinder. It will be appreciated that fuel system 218 may be a return-less fuel system, a return fuel system, or various other types of fuel system.

Vapors generated in fuel system 218 may be routed to an EVAP system 251, which includes fuel vapor canister 222, via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Fuel filler system 219 is coupled to fuel tank 220 via a fuel filler pipe 211 or neck 211.

Further, fuel filler system 219 may include refueling lock 245. In some embodiments, refueling lock 245 may be a fuel cap locking mechanism. The fuel cap locking mechanism may be configured to automatically lock the fuel cap 205 in a closed position so that the fuel cap cannot be opened. For example, the fuel cap 205 may remain locked via refueling lock 245 while pressure or vacuum in the fuel tank 220 is greater than a threshold. In response to a refueling request, e.g., a vehicle operator initiated request, the fuel tank may be depressurized and the fuel cap unlocked after the pressure or vacuum in the fuel tank falls below a threshold. Herein, unlocking the refueling lock 245 may include unlocking the fuel cap 205. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from a controller 212 of the control system 190, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more fuel vapor canisters 222 (herein also referred to simply as canister) filled with a suitable adsorbent, the canisters configured to temporarily trap fuel vapors (including vaporized hydrocarbons) generated during fuel tank refilling operations and "running loss" vapors (that is, fuel vaporized during vehicle operation). In one example, the adsorbent used is activated charcoal. The fuel vapor canister 222 includes a buffer 224 which may include a same or different adsorbent as the fuel vapor canister 222.

The buffer 224 may be positioned such that during canister loading, e.g., when the fuel vapor canister 222 receives fuel vapors from the conduit 276, the fuel vapors are first adsorbed by the buffer 224 and then by the adsorbent in the fuel vapor canister 222 once the buffer 224 is saturated. In comparison, when purging canister 222 with air drawn through a canister ventilation path or vent line 227, fuel vapors are first desorbed from the canister (e.g., to a threshold amount) before being desorbed from the buffer 224. Vent line 227 is included in emissions control system 251 and vent line 227 may route gases out of the fuel vapor canister 222 to the atmosphere when storing, or trapping, fuel vapors from fuel system 218.

Vent line 227 may also allow fresh air to be drawn into canister 222 via vent valve 229 when purging stored fuel vapors from fuel system 218 to engine intake 223 via purge line 228 and purge valve 261. For example, purge valve 261 may be normally closed but may be opened during certain conditions (such as certain engine running conditions) so that vacuum from engine intake manifold 244 is applied to the fuel vapor canister for purging. In some examples, vent line 227 may include an optional air filter 259 disposed therein upstream of canister 222. Flow of air and vapors between canister 222 and the atmosphere may be regulated by canister vent valve 229.

Fuel tank 220 is fluidically coupled to canister 222 via a conduit 276. A fuel tank isolation valve (FTIV) 252, which controls the flow of fuel tank vapors from fuel tank 220 and vapor recovery line 231 into canister 222, is located along conduit 276. In some examples, the canister 222 may be connected to the FTIV 252 via more than one conduit and the FTIV 252 may be a multi-directional valve able to adjust flow amongst the conduits. The conduits may couple to different regions of the fuel canister 222.

When adjusted to an open position, FTIV 252 allows for the venting of fuel vapors from fuel tank 220 to canister 222. Fuel vapors may be stored in canister 222 while air stripped of fuel vapors exits into atmosphere via canister vent valve 229. Stored fuel vapors in the canister 222 may be purged to engine intake 223, when engine conditions permit, via canister purge valve 261 where the fuel vapors are drawn into engine intake 223 due to a pressure gradient.

Control system 190 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, exhaust temperature or pressure sensor 233, fuel tank pressure transducer (FTPT) or pressure sensor 291, and canister load sensor 243. As such, pressure sensor 291 provides an estimate of fuel system pressure. In one example, the fuel system pressure is a fuel tank pressure, e.g. within fuel tank 220. Other sensors such as pressure, temperature, air/fuel ratio, and composition sensors may be coupled to various locations in the vehicle system 206. As another example, the actuators may include fuel injector 266, throttle 262, FTIV 252, refueling lock 245, canister vent valve 229, and canister purge valve 261. The controller 212 of control system 190 may receive input data from the various sensors, process the input data, and trigger the actuators in response to the processed input data based on instruction or code programmed therein corresponding to one or more routines. The controller 212 receives signals from the various sensors of FIG. 2 and employs the various actuators of FIG. 2 to adjust engine operation based on the received signals and instructions stored on a memory of the controller 212.

For example, responsive to detection of canister load reaching a threshold level, as estimated via canister load sensor 243, purging of fuel vapor canister 222 may be initiated. The threshold level may be an amount of fuel vapor adsorption approaching or reaching a maximum saturation of the canister adsorbent. Upon confirming that vacuum is generated at engine intake manifold 244, purge valve 261 and vent valve 229 may be opened to allow the fuel vapors to be desorbed and flushed to engine intake manifold 244.

The EVAP system of the vehicle may rely on purging of the fuel vapor canister to maintain an adsorption efficiency of the canister and to control vehicle emissions. A loading capacity of the fuel vapor canister may vary depending on a duration of a purge cycle as well as on environmental conditions. For example, the loading capacity of the fuel vapor canister may be reduced when ambient temperatures are high and the vehicle has been driven long enough for the canister to experience elevated temperatures, such as greater than 93 degrees C. When the vehicle is refueled while the fuel vapor canister is at reduced loading capacity, the canister may not be able to adsorb the vapors generated during refueling and canister breakthrough may occur.

Furthermore, in non-conventional vehicles, e.g., vehicles with stop/start technology, VDE, and HEVs, the engine may not be operated for sufficiently long periods after refueling to allow the fuel vapor canister to be purged. If the vehicle is then left parked in a hot environment, the fuel vapors may become desorbed and escape to the atmosphere. In particular, when the vehicle is fully refueled, e.g., the fuel tank is refilled to full capacity, a likelihood of emissions is increased when the vehicle is parked with a full tank.

To at least partially address these issues, a method for adaptive refueling adjustment, including adjusting refueling based on a projected post-refueling purge event and a projected canister loading capacity, may be used to control escape of fuel vapors from the fuel vapor canister. Projection of both the purge event and the canister loading capacity may be determined based on predictive machine learning and information regarding previous drive routes and destinations stored at a communication platform, such as a cloud server. For example, by anticipating a duration and destination of a drive cycle subsequent to a refueling event, the vehicle controller, e.g., controller 212 of FIG. 2, may determine whether the fuel vapor canister will be sufficiently purged. Whether the vehicle will be parked soon after the refueling event, as well as ambient conditions the vehicle may be subjected to while parked, may also be anticipated based on drive route and destination predictions.

Adjustment of the refueling based on the predictive information may include reducing an amount of fuel dispensed to the fuel tank of the vehicle by, for example, a fuel dispensing pump such as the fuel dispensing device 170 of FIG. 1. As an example, during a refueling event where the fuel vapor canister is expected to be sufficiently purged after the refueling event, the FLVV, e.g., the FLVV 285 of FIG. 2, may seal off the fuel tank when the fuel level is detected to reach a threshold level. When the fuel tank is sealed, a back pressure is generated which causes the fuel dispensing pump to stop dispensing fuel. The threshold level may be a maximum volume capacity of the fuel tank, e.g., the fuel tank is 90% filled.

When the predictive data indicates that the fuel vapor canister will not be sufficiently purged after the refueling event due to, for example, passive engine operation, an option to reduce the amount of fuel to be dispensed into the fuel tank may be provided. For example, the controller may receive information indicating that a distance to a future destination, start/stop operation of the vehicle, an anticipated speed of the vehicle, etc., as determined based on a predictive route planner and/or past drive cycles, may not provide sufficiently long engine operation to purge the fuel vapor canister. The threshold level of the fuel in the fuel tank during refueling may be adjusted to a lower volume, such as 70% of the maximum volume capacity of the fuel tank. The refueling volume may also be reduced if the vehicle is predicted to be parked in a location that may expose the vehicle to high temperatures after the refueling event.

As an example, based on the predictive data and GPS information, the vehicle may be anticipated to be parked for a prolonged period of time, e.g., more than a day, in an outdoor environment. Exposure to the outdoor environment may include subjecting the vehicle to high temperatures during a hottest time of the day which may increase a vapor pressure in the fuel tank and decrease a loading capacity of the fuel vapor canister. If the fuel tank is full, the fuel vapors may generate sufficient pressure to demand venting of the fuel vapors to the fuel vapor canister. However, the reduced loading capacity of the fuel vapor canister may not allow for further adsorption of fuel vapors and the vapors may instead be released to the atmosphere.

By reducing the refueling volume, emission of diurnal vapors, e.g., vaporization of fuel resulting from daily variations in temperature, while the vehicle is parked may be decreased. The reduced refueling volume may result in a lower loading of the fuel vapor canister and a lower likelihood of canister breakthrough. The reduction in refueling volume may be estimated by a method implemented at the vehicle controller, e.g., controller 212 of FIG. 2. One or more databases providing data such as route information, estimated purge air flow based on similar vehicle powertrains, weather forecasts, etc., may be stored in a memory of the controller. Additionally or alternatively, the controller may be communicatively linked to one or more external databases stored on a wirelessly accessible platform, such as a cloud server, to retrieve information from the external database.

As described above, determining the reduction in refueling volume may rely at least partially on an estimate of available purge time subsequent to the refueling event. The purge time may be inferred by referring to a route planner and/or a log of vehicle travel stored in the controller memory, for example. In instances where the vehicle is used in a ride hailing operation or an autonomous vehicle delivery platform, customer usage patterns and/or a ride reservations schedule may be used to estimate engine operation after refueling.

In addition, information regarding a projected parking duration under elevated temperatures, e.g., due to exposure to sunlight and or heat, after the refueling event may be used to determine the reduction in refueling volume. The route planner and/or log of vehicle travel may be similarly used to predict where and how long the vehicle may be parked. The projected engine operation and parking durations may be applied to a prophetic method for confirming if the refueling volume is to be reduced and estimating a magnitude of the volume reduction.

For example, sufficient removal of adsorbed fuel vapors, e.g., removal of at least 95% of adsorbed vapors, from the fuel vapor canister may demand purging by 300 bed volumes of air, where a bed volume is a volume of the fuel vapor canister. As an example, if the fuel vapor canister has a volume of 3 liters, 900 liters of air flow through the fuel vapor canister is required to regenerate the canister adsorbent. A predicted canister breakthrough (PCB) may be determined based on the projected engine operation (e.g., to provide purge air flow), parking conditions, and an age of the fuel vapor canister, as shown below in Equation 1. The PCB may provide an estimation of whether the refueling event, e.g., refilling the fuel tank to the threshold volume, followed by a short drive cycle and subsequent parking of the vehicle, may lead to escape of fuel vapors from the fuel vapor canister.

$$PCB = x_1(\text{Aged canister load} + \text{Diurnal vapor load}) - x_2(\text{Predicted purge air}) \quad (1)$$

The aged canister load may be determined based on a maximum loading capacity of the fuel vapor canister, such as 80% of a total capacity of the canister, multiplied by an aging factor which may vary between 1 and 1.25, depending on an age of the canister. For example, as the canister ages, the aging factor may increase, reducing the maximum loading capacity of the fuel vapor canister. The diurnal vapor load may be estimated as described above, utilizing the projected parking conditions of the vehicle, e.g., when the vehicle is keyed off. Ambient temperatures to which the vehicle may be exposed may be predicted from a weather forecast. In addition, information from a database providing environmental chamber vehicle testing data may be used to infer an amount of vapors generated due to changes in ambient temperature.

The predicted purge air may be determined as described above, e.g., based on the vehicle travel log upon receiving confirmation of a final destination of the vehicle or from data reported from similar vehicles and retrieved from a database. The total air volume anticipated to be available for purging the fuel vapor canister may also depend on the vehicle type, e.g., stop/start, HEV, ICE, etc. Variables $x_1$ and $x_2$ in equation 1 may be weighted factors to normalize an output of the PCB estimation and provide unit conversions (e.g., grams of canister load, liters of purge air).

Upon obtaining a value for the PCB, the PCB value may be used to determine if adjustment of the refueling volume is demanded. In one example, the PCB value may be compared to 0. If the PCB is equal to or less than 0, breakthrough emissions may be deemed unlikely and mitigating actions are not demanded. However, if the PCB value is greater than 0, a likelihood of fuel canister breakthrough during the parking event is increased. The threshold level of refueling may be reduced to an amount that at least decreases the PCB value to 0. As such, a vent valve, such as the vent valve 229 of FIG. 2, may be closed when the fuel level in the fuel tank reaches the adjusted threshold level. By closing the vent valve, back pressure is generated in the fuel tank, causing the dispensing device to shut off.

The amount of fuel to be added to the fuel tank during refueling may be selected based on a relationship between fuel level and fuel vapor canister loading. For example, a table such as Table 1 (shown below) may be stored in the controller's memory and retrieved when the PCB value is determined.

TABLE 1

Example fuel tank refueling levels according to fuel vapor canister loading

| Fuel Amount | New Canister Load | Aged Canister Load |
|---|---|---|
| 20% | 20% | 20% |
| 40% | 30% | 40% |
| 60% | 50% | 60% |
| 80% | 70% | 90% |
| 100% | 80% | >100% |

Table 1 shows the amount of fuel to be added to the fuel tank as a percentage of the maximum volume of the fuel tank relative to a loading capacity of a new canister and a loading capacity of an aged canister. The aged canister load may be determined from the new canister load and the aging factor, as described above. The amount of fuel to be added may be selected based on aged canister load percentage determined to result in a PCB of 0 or less. For example, an aged canister load of 100% may correspond to a PCB of 0.5. Reducing the aged canister load to 90% may decrease the PCB to 0. The fuel tank may be therefore refilled to 80% (e.g., corresponding to the 90% canister load) of the fuel tank volume to mitigate canister breakthrough.

Figure 3:
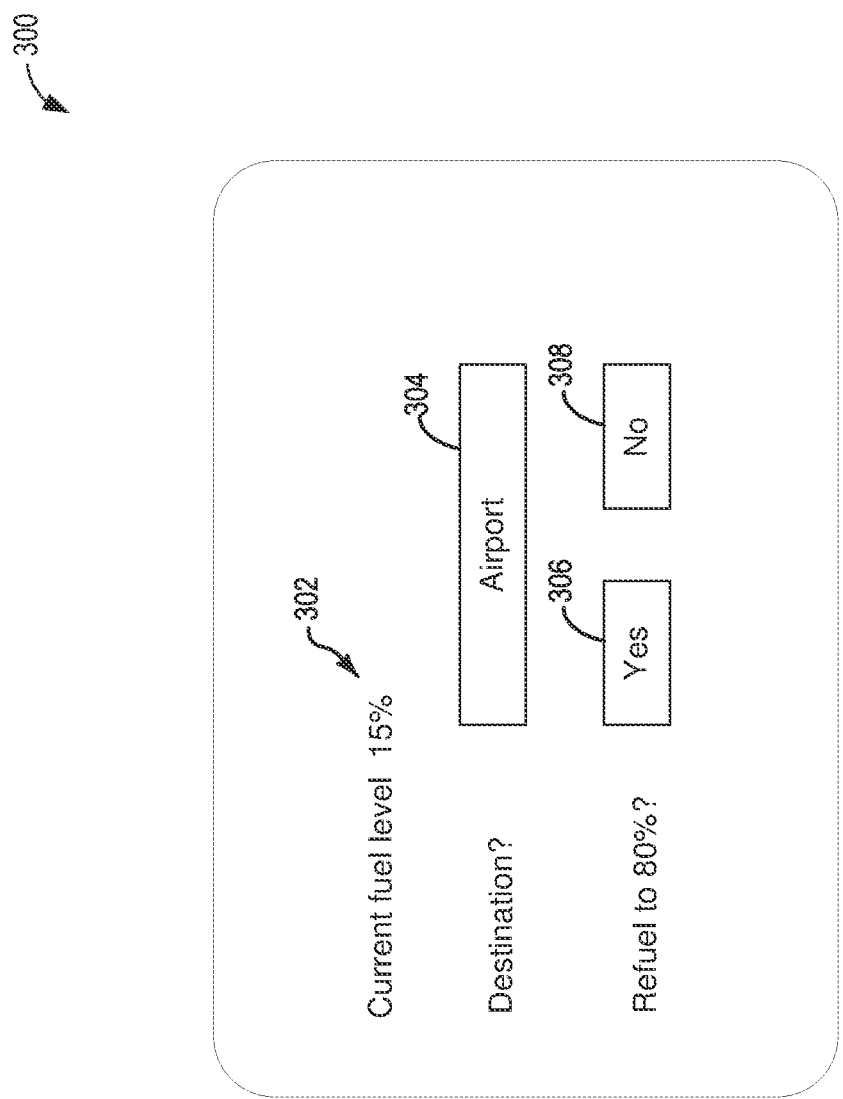
FIG. 3 shows an example user interface which may be implemented in the vehicle including the EVAP control system of FIG. 2.

A vehicle user may be notified of a recommended reduction in refueling level by an alert or a notification. In one example, the alert may be provided at a human machine interface of the vehicle, such as a dashboard user interface. The user interface may be, for example a touch screen configured to display messages and receive user input via touch. An example of a user interface 300 is illustrated in FIG. 3 which may be included in a vehicle such as the vehicle with the EVAP system 251 of FIG. 2.

The user interface 300 may include a fuel level notification 302 based on information from a fuel level sensor in a fuel tank of the vehicle. The fuel level notification 302 may be displayed when, for example, the fuel level decreases to a threshold level, such as 15%, and a demand for refueling is imminent. However, in other examples, the threshold level may be various values below 30% of the maximum volume capacity of the fuel tank.

The user may input a future destination of the vehicle at a first input box 304 which may prompt the vehicle controller to retrieve data from a travel log of the vehicle and/or databases providing route information from other vehicles and evaluate conditions at the destination, e.g., indoor or outdoor vehicle location, ambient temperature, etc. Engine operation may be estimated based on the data and a PCB value may be estimated based on aged canister loading and projected diurnal vapors. If the PCB value is greater than zero, a request to adjust the refueling volume may be displayed at the user interface 300. The user may provide confirmation to proceed with refueling adjustment at a second input box 306, e.g., by selecting "yes". Alternatively, the user may deny the suggested refueling adjustment at a third input box 308, e.g., by selecting "no".

A first method 400 for reducing a likelihood of fuel vapor canister breakthrough and a second method 500 for adjusting a refueling volume for a vehicle is shown in FIGS. 4 and 5 respectively. The methods 400 and 500 may be implemented in a vehicle with a propulsion system 100 as shown in FIG. 1 and vehicle system 206 of FIG. 2. For example, the vehicle may be an HEV, have stop/start technology or a VDE, or be a conventional ICE vehicle. The vehicle may include a user interface, such as the user interface 300 of FIG. 3. Instructions for carrying out methods 400 and 500 may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the method described below.

Turning first to FIG. 4, at 402, method 400 includes estimating and/or measuring current engine operating conditions. For example, a request for torque may be detected based on a signal from a pedal position sensor, such as the pedal position sensor 194 of FIG. 1, a fuel level in a fuel tank of the vehicle may be measured by a fuel level sensor, a fuel tank pressure may be monitored by a pressure sensor such as the pressure sensor 291 of FIG. 2, a canister load may be measured by a canister load sensor such as the canister load sensor 243 of FIG. 2. At 404, the method includes confirming if the fuel level in the fuel tank is below a first threshold. The first threshold may be an amount of fuel remaining in the fuel tank to enable a travel margin sufficient for the vehicle to navigate to a refueling station. For example, the first threshold may be 10% of a volume of the fuel tank. As another example, the first threshold may be a quantity of fuel estimated to power engine operation for a distance of 50 miles. As another example, the first threshold may be a dynamic value, wherein the first threshold is based on an amount of fuel desired to reach a nearest refueling station.

If the fuel level is at or above the first threshold, the method includes continuing engine operation under the current conditions at 406. The method returns to the start. If the fuel level is below the first threshold, the method proceeds to 407 to activate a fuel level alert. For example, a low fuel indicator lamp may be illuminated on a dashboard of the vehicle. Furthermore, a notification may be displayed on the user interface.

At 408, the method includes confirming a destination of the vehicle. In one example, a travel log may be retrieved from the controller's memory and a current vehicle route compared to previous drive cycles. The destination may be predicted based on similarities to a past trip, e.g., the vehicle has navigated to a particular location multiple times in the past, following a same route at a similar time of day or day of the week, etc. Confirmation of the predicted destination from the user may be obtained by displaying a message requesting the confirmation at the user interface. As another example, the destination may be determined from a mapped location on a GPS system of the vehicle or on a mobile device wirelessly linked or paired with a controller area network (CAN) bus of the vehicle. As yet another example, user input to identify the destination may be obtained by displaying a prompt requesting destination information at the user interface.

Upon confirming the driving destination, the method includes determining a PCB value at 410. Determining the PCB may include, at 412, estimating an aged canister load. The aged canister load may be inferred based on a maximum loading capacity of the fuel vapor canister, e.g., a manufacturer-predetermined maximum loading, and an aging factor of the canister. The PCB value may also be determined by estimating a diurnal vapor load of the canister at 414. The diurnal vapor load may be predicted based on the destination of the vehicle and how long the vehicle is projected to be parked at the destination (e.g., as confirmed or input by the user). Furthermore, a weather forecast may be used in conjunction with environmental chamber vehicle testing data to infer changes in ambient temperature which may affect vapor generation at the canister.

In addition, determining the PCB value may also include estimating purge air flow through the canister at 416. Purge air may flow into the fuel vapor canister during a purging event through a vent line, e.g., the vent line 227 of FIG. 2 fluidically coupling the fuel vapor canister to the atmosphere. A vent valve (e.g., vent valve 229 of FIG. 2) and purge valve (e.g., purge valve 261 of FIG. 2) may be opened when the engine is operating and vacuum is generated at an intake manifold of the engine. A projected amount of purge air may be inferred based on the destination, the type of vehicle, data from previous trips, and/or data obtained from other vehicles with a similar powertrain navigating a similar route (e.g., as retrieved from a database).

The predicted aged canister load, diurnal vapor load, and purge air may be applied to equation 1 (as shown above) to estimate the PCB value. At 418, the method includes confirming if the PCB value is less than or equal to 0. If the PCB value is less than or equal to 0, the method proceeds to 420 to indicate, e.g., by displaying a message at the user interface, that adjustment of the refueling volume is not demanded. Alternatively, no notification may be demanded and refueling may proceed without adjustment. However, if the PCB value is greater than 0, the method continues to 422 to indicate a likelihood of canister breakthrough may be increased with respect to anticipated parking of the vehicle at the destination. For example, an alert may be displayed at the user interface. Method 400 continues to method 500 at FIG. 5.

At 502, method 500 includes obtaining confirmation from the user that the refueling volume is to be adjusted. For example, as shown in FIG. 4, user input may be requested from the user at the user interface to either confirm or deny adjustment of the refueling volume based on the PCB value. If the refueling adjustment is denied, e.g., the user inputs "no" at the user interface, the method continues to 504 to proceed with a future refueling event without adjusting, e.g., reducing, an amount of fuel to be added to the fuel tank (based on anticipated refilling of the fuel tank to the maximum capacity).

In some examples, adjustment of the refueling volume may occur automatically, without demanding user confirmation. As such, obtaining confirmation at 502 may be omitted and method 500 may proceed directly to 506.

If the refueling adjustment is confirmed, e.g., the user inputs "yes" at the user interface, the method includes confirming if a refueling event is initiated at 506. The refueling event may be initiated when a fuel door or fuel hatch is unlocked or when a fuel tank cap is removed. In other examples, the refueling event may be initiated when a fuel dispensing pump is inserted into the fuel tank or when the fuel level sensor detects a change in the fuel level as fuel is added from the fuel dispensing pump. If the refueling event is not initiated, the method returns to 506 to confirm initiation of the refueling event. If the refueling event is initiated, the method continues to 508 to determine the adjusted refueling volume (with respect to refilling of the fuel tank to the maximum capacity).

The adjusted, e.g., reduced, refueling volume may be estimated by referring to a look-up table, such as Table 1 above, stored in the controller's memory. As described above, the table may provide refueling levels as a percentage of the maximum fuel tank capacity corresponding to the predicted aged canister load. For example, if decreasing the aged canister load from 90% to 70% causes the PCB value to decrease to zero from a value above 0, the decrease in the aged canister load may correspond to reducing the refueling volume to a maximum of 80% of the fuel tank capacity.

At 510, the method includes confirming if the fuel level reaches (e.g., is equal to) a second threshold. The second threshold is a fuel level or volume that is greater than the current fuel level/volume in the fuel tank and may correspond to the adjusted refueling volume estimated at 508. If the fuel level does not reach the second threshold, the method returns to 510 to continue monitoring the fuel level by, for example, the fuel level sensor. If the fuel level does reach the second threshold, the method proceeds to 512 to command closing of the vent valve. Closing the vent valve during refueling may generate backpressure in the fuel tank, causing a fuel dispensing pump to shut off when the backpressure is detected. The method ends.

Examples of EVAP system operations and parameters leading to implementation of adaptive refueling adjustment in a vehicle is shown in FIG. 6 at graph 600. The vehicle may include the EVAP system 251 of FIG. 2. Graph 600 depicts a fuel level in a fuel tank of the vehicle at plot 602, a status of a fuel level alert at plot 604, a status of a vent valve in a fuel vapor canister vent line at plot 606, and a loading of the fuel vapor canister at plot 608. The horizontal axis represents time, with time increasing from left to right. For plot 602, the fuel level increases along the y-axis and includes a first threshold 610, representing a maximum volume capacity of the fuel tank, a second threshold 612, representing a fuel level alert threshold at which the fuel level alert is triggered, and a third threshold 614, representing an adjusted maximum volume capacity of the fuel tank which is lower than the first threshold 610. The fuel level alert varies between off and on along the y-axis in plot 604 and the vent valve varies between closed and open along the y-axis in plot 606. For plot 608, loading of the fuel vapor canister increase along the y-axis and a fourth threshold 616, representing a maximum load capacity of the fuel vapor canister, is included.

At t0, the vehicle engine is operating and the fuel level (plot 602) is above the second threshold 612. The fuel level alert (plot 604) is off and the vent valve (plot 606) is open during engine operation to enable purging of the fuel vapor canister. The fuel vapor canister load (plot 608) decreases as the fuel vapor canister is purged.

The fuel level decreases to the second threshold 612 at t1. In response, the fuel level alert is activated to notify a user of a low fuel status of the fuel tank. The vent valve remains open until the engine is turned off between t1 and t2, at which the vent valve is closed. The fuel vapor canister load decreases until the vent valve is closed.

At t2, a refueling event is indicated, e.g., by insertion of a fuel dispensing device into a nozzle of the fuel tank. For example, a vehicle controller may be notified of imminent dispensing of fuel into the fuel tank. In response to the indication of the refueling event, a PCB may be determined, as described above. The PCB is compared to a threshold value, e.g., zero. For example, the PCB may be greater than zero and adaptive refueling adjustment may be executed. As refueling proceeds, the fuel level increases and the vent valve is opened to alleviate backpressure in the fuel tank. As fuel vapors are generated in the fuel tank, the vapors are vented to the fuel vapor canister and the fuel vapor canister load rises.

At t3, the fuel level reaches the third threshold 614, as determined based on adaptive refueling adjustment. The vent valve is closed slightly before the fuel level reaches the third threshold 614 to reduce a hysteresis effect. Upon closing of the vent vale, backpressure is generated in the fuel tank, causing the fuel dispensing device to stop dispensing fuel. The fuel vapor load ceases to rise and remains below the fourth threshold 616.

In this way, fuel vapor canister breakthrough may be reduced after a refueling event of a vehicle. In particular, a likelihood of fuel vapor escape from the canister may be decreased by adjusting an amount of fuel dispensed during the refueling event, even when followed by a period of vehicle vehicle-off under fluctuating ambient temperatures after a short drive cycle. The adjusted amount of fuel may correspond to a reduced maximum fuel level measured in a fuel tank of the vehicle, where the reduced maximum fuel level is determined based on a PCB value. The PCB may be estimated by predicting an aged canister load, a diurnal vapor load and an amount of purge air available during the post-refueling drive cycle. The predictions may rely on wireless connectivity between the vehicle controller and wirelessly accessible data platforms as well as logs of previous vehicle travel. By adjusting the amount of dispensed fuel according to the PCB value, escape of emissions from an EVAP system of the vehicle is mitigated.

A technical effect of adjusting the refueling volume in response to predicted fuel vapor canister breakthrough is that loading of the fuel vapor canister beyond saturation is circumvented, thereby reducing vehicle emissions during a vehicle-off period.

The disclosure also provides support for a method comprising:
halting a dispensing of fuel to a fuel tank during a refueling event by increasing a backpressure in the fuel tank, the halting of the dispensing of fuel based on one or more of an upcoming fuel vapor canister purge event and an estimated fuel vapor canister loading capacity. In a first example of the method, halting the dispensing of fuel based on the upcoming fuel vapor canister purge event includes predicting a duration of engine operation after the refueling event. In a second example of the method, optionally including the first example, predicting the duration of engine operation includes referring to one or more of a vehicle travel log, a driving destination, and a type of vehicle propulsion and wherein referring to the type of vehicle propulsion includes confirming if the vehicle is one of a hybrid electric vehicle, a start/stop technology-implemented vehicle, a vehicle with a variable displacement engine, and an internal combustion engine vehicle. In a third example of the method, optionally including the first and second examples, halting the dispensing of fuel based on the estimated fuel vapor canister loading capacity includes predicting the loading capacity of a fuel vapor canister based on an age of the fuel vapor canister. In a fourth example of the method, optionally including the first through third examples, halting the dispensing of fuel based on the estimated fuel vapor canister loading capacity further includes estimating a diurnal vapor loading of the fuel vapor canister. In a fifth example of the method, optionally including the first through fourth examples, estimating the diurnal vapor loading includes predicting a duration of a vehicle vehicle-off period following the refueling event and projecting ambient temperatures during the vehicle vehicle-off period. In a sixth example of the method, optionally including the first through fifth examples, estimating the diurnal vapor loading further includes retrieving environmental chamber vehicle testing data to estimate an amount of vapors generated in the fuel vapor canister due to changes in ambient temperature. In a seventh example of the method, optionally including the first through sixth examples, halting the dispensing of fuel includes reducing the amount of fuel relative to a maximum volume capacity of the fuel tank when canister breakthrough is predicted for an upcoming vehicle vehicle-off period following the refueling event. In an eighth example of the method, optionally including the first through seventh examples, increasing the backpressure in the fuel tank includes closing a vent valve in a vent line of a fuel vapor canister during the refueling event.

The disclosure also provides support for a method for vehicle, comprising: responsive to a projected vehicle-off period of a vehicle after a refueling event, determining a predicted canister breakthrough based on one or more of an estimated fuel vapor canister loading capacity, an estimated diurnal vapor load, and an estimated amount of purge air flow at a fuel vapor canister, and responsive to estimation of a value of the predicted canister breakthrough to exceed a threshold value, adjusting an amount of fuel dispensed to a fuel tank during the refueling event. In a first example of the method, determining the predicted canister breakthrough based on the estimated amount of purge air flow includes one or more of retrieving data from a travel log of the vehicle and retrieving data from a database providing data from vehicles of a similar powertrain navigating a similar route. In a second example of the method, optionally including the first example, determining the predicted canister breakthrough includes indicating an increased likelihood of canister breakthrough during the projected vehicle-off period when the value of predicted canister breakthrough is greater than the threshold value. In a third example of the method, optionally including the first and second examples, determining the value of the predicted canister breakthrough includes not adjusting the amount of fuel dispensed to the fuel tank when the value of the predicted canister breakthrough is equal to or less than the threshold value. In a fourth example of the method, optionally including the first through third examples, adjusting the amount of fuel dispensed to the fuel tank includes determining a reduced fuel level threshold according to a fuel loading capacity expected to decrease the value of the predicted canister breakthrough to the threshold value. In a fifth example of the method, optionally including the first through fourth examples, adjusting the amount of fuel to the fuel tank further includes closing a valve in a vent line configured to fluidically couple the fuel vapor canister to the atmosphere and wherein closing the valve includes blocking flow between the fuel vapor canister and the atmosphere when the fuel level reaches the reduced fuel level threshold. In a sixth example of the method, optionally including the first through fifth examples, closing the valve causes a pressure to increase in the fuel tank when the fuel level reaches the reduced fuel level threshold during the refueling event and wherein the increase in pressure causes a device dispensing fuel to the fuel tank to shut off.

The disclosure also provides support for an evaporative emission control (EVAP) system for a vehicle, comprising: a fuel tank, a fuel vapor canister fluidically coupled to the fuel tank and configured to receive fuel vapors from the fuel tank during a refueling event, a valve arranged in a vent line of the fuel vapor canister, and a controller with computer readable instructions stored on non-transitory memory that, when executed during the refueling event, cause the controller to: halt a dispensing of fuel to the fuel tank during the refueling event based on one or more of an upcoming fuel vapor canister purge event and an estimated fuel vapor canister loading capacity. In a first example of the system, the estimated fuel vapor canister loading capacity is determined based on an age of the fuel vapor canister and projected generation of diurnal vapors in the fuel vapor canister during a vehicle-off period of the vehicle following the refueling event. In a second example of the system, optionally including the first example, one or more of the upcoming fuel vapor canister purge event and the estimated fuel vapor canister loading capacity is used to determine a predicted canister breakthrough value and wherein the amount of fuel dispensed to the fuel tank is reduced when the predicted canister breakthrough value exceeds a threshold value. In a third example of the system, optionally including the first and second examples, the valve is closed before the fuel tank is filled to a maximum capacity of the fuel tank when the predicted canister breakthrough value exceeds the threshold value.

In another representation, a method for a vehicle includes reducing an amount of fuel dispensed to the vehicle fuel tank during refueling based on an anticipated canister breakthrough. In a first example of the method, reducing the amount of fuel includes monitoring a fuel level in the fuel tank until the fuel level reaches a reduced threshold and closing a vent valve of the fuel vapor canister vent line when the fuel level reaches the reduced threshold. A second example of the method optionally includes the first example, and further includes, wherein the reduced threshold is a decreased volume of fuel in the fuel tank relative to a maximum volume capacity of the fuel tank. A third example of the method optionally includes one or more of the first and second examples, and further includes wherein reducing the amount of fuel based on the anticipated canister breakthrough includes utilizing one or more of databases stored on a cloud server, a vehicle travel log, and vehicle testing data to estimate a value of the anticipated canister breakthrough.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
halting a dispensing of fuel to a fuel tank during a refueling event by increasing a backpressure in the fuel tank, the halting of the dispensing of fuel based on one or more of an upcoming fuel vapor canister purge event and an estimated fuel vapor canister loading capacity.

2. The method of claim 1, wherein halting the dispensing of fuel based on the upcoming fuel vapor canister purge event includes predicting a duration of engine operation after the refueling event.

3. The method of claim 2, wherein predicting the duration of engine operation includes referring to one or more of a vehicle travel log, a driving destination, and a type of vehicle propulsion and wherein referring to the type of vehicle propulsion includes confirming if the vehicle is one of a hybrid electric vehicle, a start/stop technology-implemented vehicle, a vehicle with a variable displacement engine, and an internal combustion engine vehicle.

4. The method of claim 1, wherein halting the dispensing of fuel based on the estimated fuel vapor canister loading capacity includes predicting the loading capacity of a fuel vapor canister based on an age of the fuel vapor canister.

5. The method of claim 1, wherein halting the dispensing of fuel based on the estimated fuel vapor canister loading capacity further includes estimating a diurnal vapor loading of the fuel vapor canister.

6. The method of claim 5, wherein estimating the diurnal vapor loading includes predicting a duration of a vehicle vehicle-off period following the refueling event and projecting ambient temperatures during the vehicle vehicle-off period.

7. The method of claim 6, wherein estimating the diurnal vapor loading further includes retrieving environmental chamber vehicle testing data to estimate an amount of vapors generated in the fuel vapor canister due to changes in ambient temperature.

8. The method of claim 1, wherein halting the dispensing of fuel includes reducing the amount of fuel relative to a maximum volume capacity of the fuel tank when canister breakthrough is predicted for an upcoming vehicle vehicle-off period following the refueling event.

9. The method of claim 1, wherein increasing the backpressure in the fuel tank includes closing a vent valve in a vent line of a fuel vapor canister during the refueling event.

10. An evaporative emission control (EVAP) system for a vehicle, comprising:
a fuel tank;
a fuel vapor canister fluidically coupled to the fuel tank and configured to receive fuel vapors from the fuel tank during a refueling event;
a valve arranged in a vent line of the fuel vapor canister; and a controller with computer readable instructions stored on non-transitory memory that, when executed during the refueling event, cause the controller to:

halt a dispensing of fuel to the fuel tank during the refueling event based on one or more of an upcoming fuel vapor canister purge event and an estimated fuel vapor canister loading capacity.

11. The EVAP system of claim 10, wherein the estimated fuel vapor canister loading capacity is determined based on an age of the fuel vapor canister and projected generation of diurnal vapors in the fuel vapor canister during a vehicle-off period of the vehicle following the refueling event.

12. The EVAP system of claim 10, wherein one or more of the upcoming fuel vapor canister purge event and the estimated fuel vapor canister loading capacity is used to determine a predicted canister breakthrough value and wherein the amount of fuel dispensed to the fuel tank is reduced when the predicted canister breakthrough value exceeds a threshold value.

13. The EVAP system of claim 12, wherein the valve is closed before the fuel tank is filled to a maximum capacity of the fuel tank when the predicted canister breakthrough value exceeds the threshold value.

\* \* \* \* \*